United States Patent
Zhu et al.

(10) Patent No.: US 7,878,682 B2
(45) Date of Patent: *Feb. 1, 2011

(54) MIXED LIGHT APPARATUS

(75) Inventors: Jun Zhu, Beijing (CN); He Zhang, Beijing (CN); Guo-Fan Jin, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 260 days.

This patent is subject to a terminal disclaimer.

(21) Appl. No.: 12/187,847

(22) Filed: Aug. 7, 2008

(65) Prior Publication Data
US 2009/0116238 A1 May 7, 2009

(30) Foreign Application Priority Data
Nov. 2, 2007 (CN) .................... 2007 1 0124242

(51) Int. Cl.
*F21V 5/00* (2006.01)

(52) U.S. Cl. .............. 362/245; 362/249.01; 362/249.02

(58) Field of Classification Search ................ 362/97.1, 362/97.2, 97.3, 237, 230, 231, 235, 236, 362/245, 249.02, 511, 543, 544, 551, 555, 362/561, 612, 621; 349/57, 62; 385/33, 385/35, 45
See application file for complete search history.

(56) References Cited

U.S. PATENT DOCUMENTS 3,923,394 A 12/1975 Frankiewicz
6,527,411 B1 * 3/2003 Sayers ........................ 362/245

* cited by examiner

*Primary Examiner*—Hargobind S Sawhney
(74) *Attorney, Agent, or Firm*—D. Austin Bonderer

(57) ABSTRACT

A mixed light apparatus for mixing light emitted from a first light source and a second light source includes a body, a first light reflecting element, a second light reflecting element and a field lens. The body has a light emitting surface. A first reflecting element extends from the light emitting surface. The first light reflecting element has a first emanating point and a first focal point. The first light source is disposed at the first focal point. A second light reflecting element extends from the light emitting surface. The second light reflecting element has a second emanating point and a second focal point. The second light source is disposed at the second focal point. The first emanating point and the second emanating point overlap at the light emitting surface. The field lens is disposed on the light emitting surface and corresponds to the first and second emanating points.

23 Claims, 5 Drawing Sheets

MIXED LIGHT APPARATUS

BACKGROUND

1. Technical Field

The invention relates to a mixed light apparatuse and, particularly, to a mixed light apparatus for LED-based light sources.

2. Description of Related Art

Currently, because liquid crystal displays (LCDs) are thin, lightweight, long lasting, and consume little power, they are extensively used in a variety of electronic devices. However, because LCDs are not self-luminescent, backlight modules are typically required. Generally, backlight modules can be categorized as either direct-type backlight modules or edge-type backlight modules. Because direct-type backlight modules can provide high illumination in comparison with edge-type backlight modules, direct-type backlight modules are more widely employed in numerous applications.

Referring to FIG. 1, a conventional direct-type backlight module 10 includes a substrate 11, a light source 12 and a diffusion plate 14. The light source 12 is disposed on the substrate 11. The light source 12 can employ a plurality of point light sources (e.g. light emitting diode, LED) or a linear light source (e.g. cold cathode fluorescent lamp, CCFL). An LED array is extensively employed as the light source 12 for LCDs because the LED is resistant from mercury pollution, while exhibiting qualities of high color saturation and longevity. The diffusion plate 14 is disposed above the substrate 11 for allowing light emitted from the light source 12 to be uniform and providing light for an associated display panel.

The LED array consists of a plurality of red LEDs 12a, green LEDs 12b and blue LEDs 12c. The LEDs 12a, 12b, 12c are uniformly distributed on the substrate 11 according to the color of emitted light. Particularly, rows of red LEDs 12a, green LEDs 12b, and blue LEDs 12c are arranged in alternating fashion. Red, green, and blue light, is emitted from the light source 12 and mixed continuously until reaching the diffusion plate 14 to produce white light. A predetermined distance between the light source 12 and the diffusion plate 14 is required for mixing the emitted light and providing uniform illumination.

Because of a recent increase in demand for thin and lightweight LCDs, the distance provided for mixing emitted light has shortened, resulting in poor mixing, thereby producing a yellowish-blue light rather than the intended white light.

In addition, when a large number of red, green and blue LEDs are utilized for a large-scale LCD production, the white light emitted from such an LCD has low energy and color saturation. Moreover, the color of the mixed light in such manner cannot be adjusted as desired.

Furthermore, the LED acts as a Lambertian source and emits light over high radiation angles, i.e. ±90 degrees. Thus, it is common to use a lens over the point light sources to narrow the light beam. However, as of now, there is no suitable lens for completely converging light with divergent radiation angles. Therefore, if the light beam emitted from each low-power LED cannot be totally converged to the associated display panel, the illumination efficiency is consequentially lowered.

What is needed, therefore, is a mixed light apparatus for providing adjustable color light having improved color saturation, improved uniformity, high energy, and the ability to efficiently converge light with divergent radiation angles.

BRIEF DESCRIPTION OF THE DRAWINGS

The components in the drawing are not necessarily drawn to scale, the emphasis instead being placed upon clearly illustrating the principles of the present mixed light apparatus. In the drawings, all the views are schematic.

Figure 1:
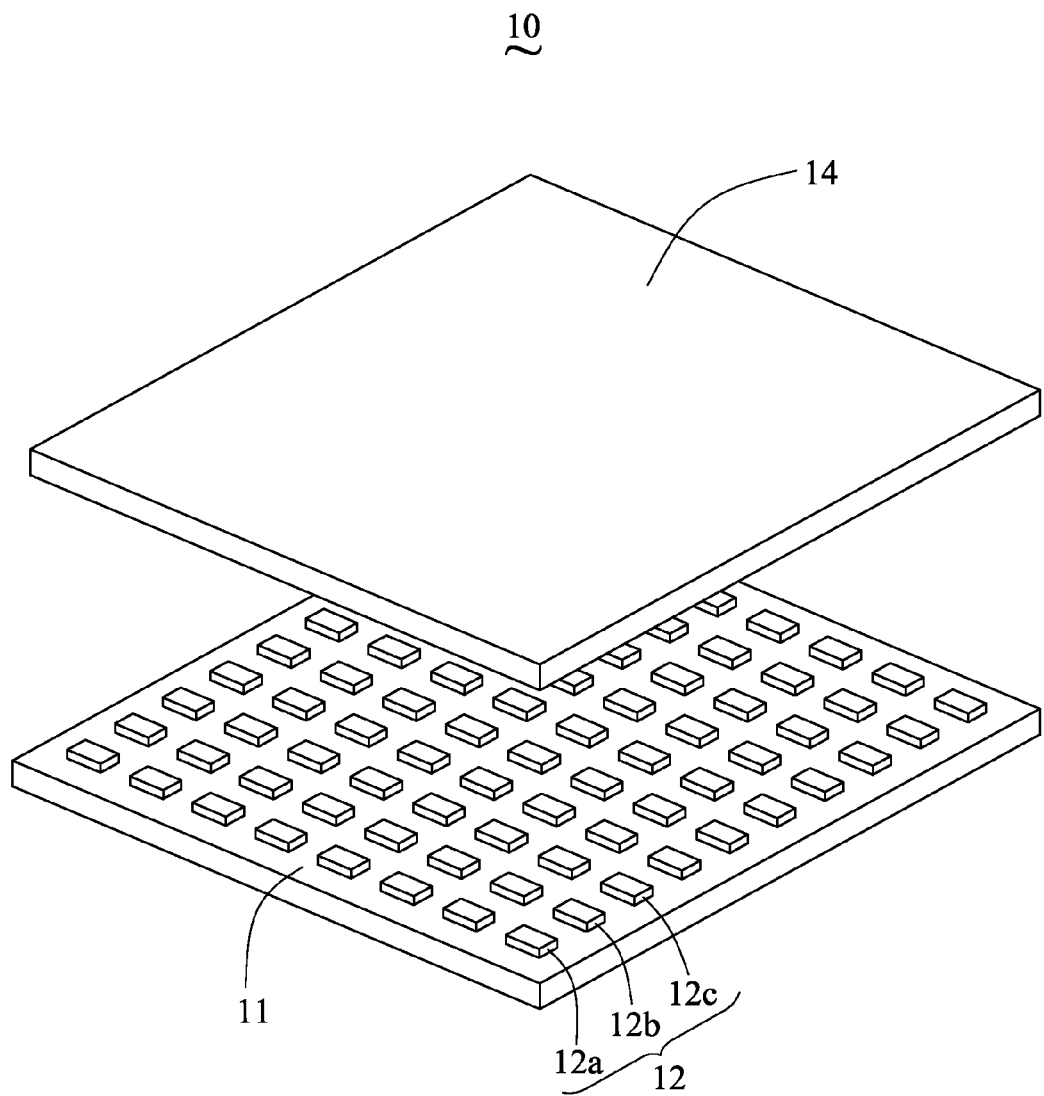
FIG. 1 is an exploded view of a conventional direct type backlight module.

Corresponding reference characters indicate corresponding parts. The exemplifications set out herein illustrate at least one exemplary or exemplary embodiment of the present mixed light apparatus, in various forms, and such exemplifications are not to be construed as limiting the scope of the invention in any manner.

DETAILED DESCRIPTION OF THE EMBODIMENTS

References will now be made to the drawings to describe embodiments of the present mixed light apparatus in detail.

Figure 2:
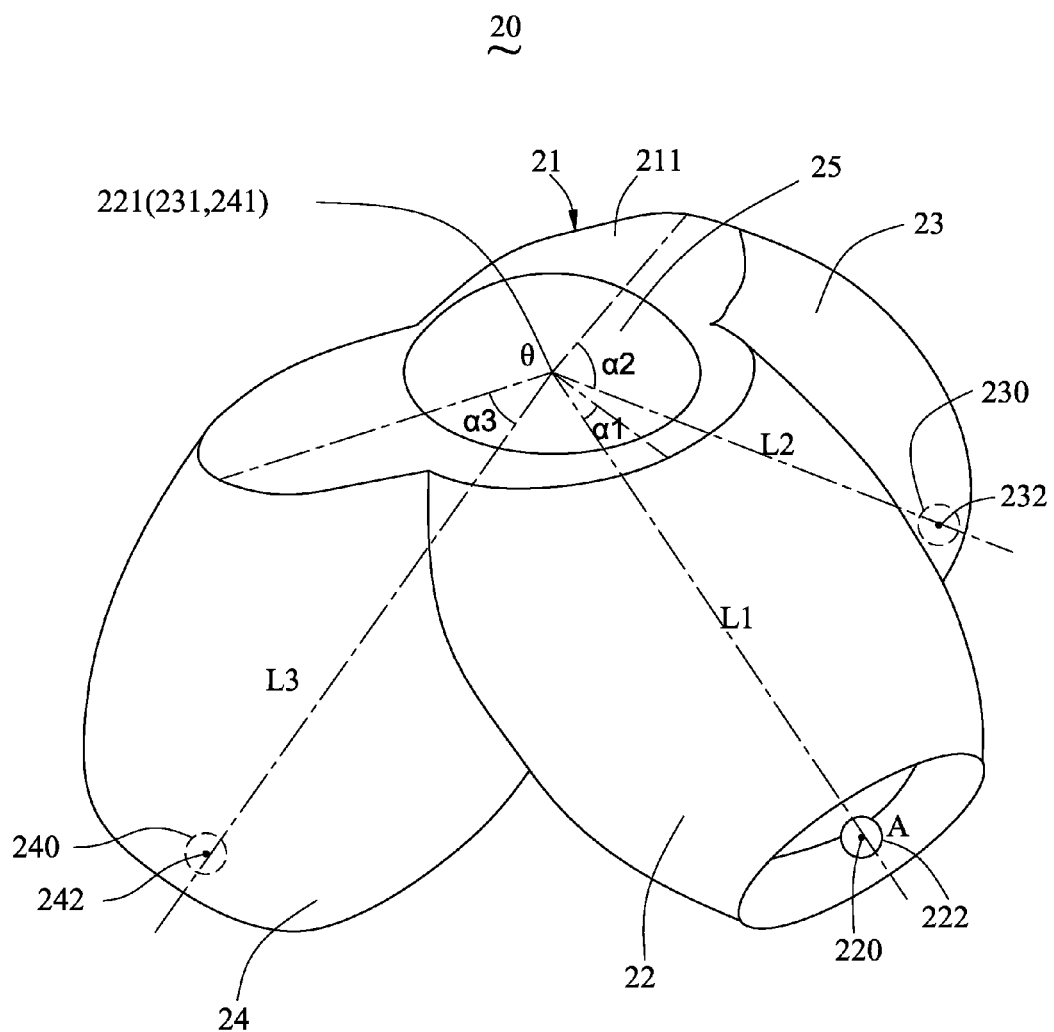
FIG. 2 is an isometric view of a mixed light apparatus in accordance with an exemplary embodiment of the present invention.
Figure 3:
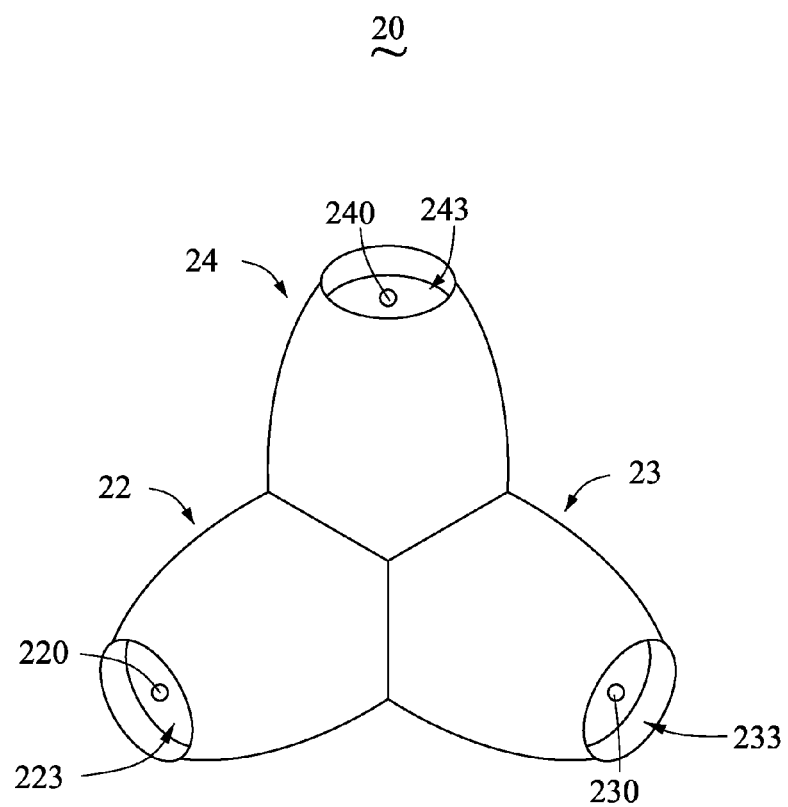
FIG. 3 is an isometric view from below of the mixed light apparatus of FIG. 2.

Referring to FIG. 2 and FIG. 3, a mixed light apparatus 20 according to an embodiment of the present invention is shown. The mixed light apparatus 20 for mixing light emitted from at least two light sources 220, 230 or 240 includes: a body 21, at least two light reflecting elements 22, 23 or 24, and a field lens 25. The light sources 220, 230 or 240 correspond to the light reflecting elements 22, 23 or 24, respectively.

Referring to FIG. 2 and FIG. 3, in the illustrated embodiment, the mixed light apparatus 20 includes a first light reflecting element 22, a second light reflecting element 23, and a third light reflecting element 24. Additionally, a first light source 220, a second light source 230, and a third light source 240 correspond with light reflecting elements 22, 23, 24, respectively. In the illustrated embodiment, each of the light reflecting elements 22, 23, 24 has a solid oval-shaped body and is made of a transparent material, such as glass or polymethyl methacrylate (PMMA).

The body 21 has a light emitting surface 211. The first light reflecting element 22 extends from the light emitting surface 211, and has a first emanating point 221 and a first focal point 222. The first light source 220 is disposed at the first focal point 222. In addition, the first emanating point 221 and the first focal point 222 are on a first axis L1.

The second light reflecting element 23 is adjacent to the first light reflecting element 22 and extends from the light emitting surface 211. The second light reflecting element 23 has a second emanating point 231 and a second focal point 232. The second light source 230 is disposed at the second focal point 232. In addition, the second emanating point 231 and the second focal point 232 are on a second axis L2.

The third reflecting element 24 extends from the light emitting surface 211. The third light reflecting element 24 has a third emanating point 241 and a third focal point 242. The third light source 240 is disposed at the third focal point 242. Additionally, the third emanating point 241 and the third focal point 242 are on a third axis L3.

The first emanating point 221, the second emanating point 231, and the third emanating point 241 overlap at the light emitting surface 211. Specifically, the first axis L1, the second axis L2 and the third axis L3 meet at a common point O. The common point O is defined on the light emitting surface 211. $\alpha_1$, $\alpha_2$ and $\alpha_3$ are inclined angles of the axes L1, L2, L3 and the light emitting surface 211, respectively. The inclined angles $\alpha_1$, $\alpha_2$, $\alpha_3$ range from about 40 degrees to about 70 degrees. In the present embodiment, $\alpha_1$, $\alpha_2$ and $\alpha_3$ are about 60 degrees. Moreover, angles between the first axis L1, the second axis L2 and the third axis L3 are approximately equal, but may not be so in other embodiments.

The light emitting surface 211 is disposed opposite to the light sources 220, 230, 240. The light emitting surface 211 is a planar surface. It is to be understood that the shape of the light emitting surface 211 is not limited to what is mentioned above. Alternatively, the light emitting surface 211 can be a curved surface. Each of the light sources 220, 230, 240 can be a light-emitting diode (LED), such as a single-color LED or a multi-color LED. In the present embodiment, the first light source 220 is a red LED. The second light source 230 is a green LED. The third light source 240 is a blue LED.

Figure 4:
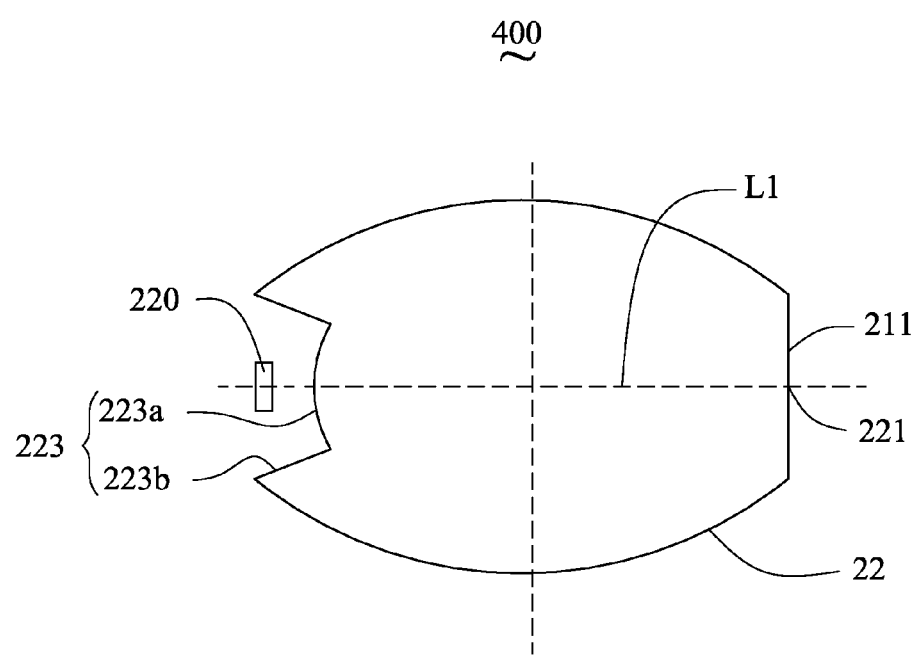
FIG. 4 is a cross-sectional view of a light reflecting element of the mixed light apparatus of FIG. 2.

Referring to FIG. 3 and FIG. 4, each of the light reflecting elements 22, 23, 24 respectively includes a concave structure 223, 233, 243 disposed at one end thereof where the light sources 220, 230, 240 are correspondingly located. The concave structures 223, 233, 243 can be capable of accommodating the light sources 220, 230, 240 disposed at the focal points 222, 232, 242. Referring to FIG. 4, the cross-sectional view of the first light reflecting element 22 is shown. The concave structure 223 is generally frustum-shaped but may, for example, be cylindrical. In addition, the concave structure 223 has a spherical bottom 223a and a lateral surface 223b. The curvature radius of the spherical bottom 223a approximately ranges from 2.6 mm to 3.5 mm.

Figure 5:
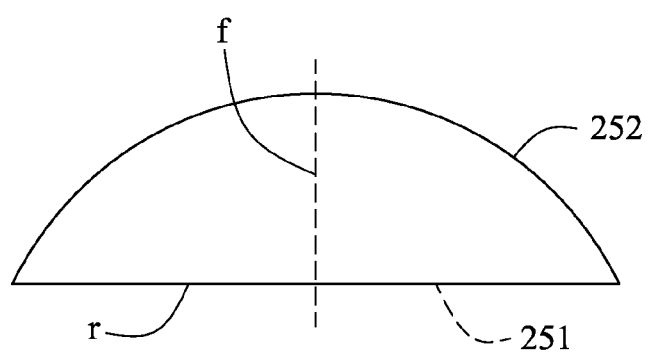
FIG. 5 is a cross-sectional view of a field lens of the mixed light apparatus of FIG. 2, showing a relationship between a radius of a bottom surface thereof and a curvature radius of a curved surface thereof.

Referring to FIG. 2, the field lens 25 is disposed above the light emitting surface 211. Particularly, the field lens 25 is located correspondingly to the common point O where the first emanating point 221, the second emanating point 231 and the third emanating point 241 meet. The field lens 25 is configured to concentrate and emit the light mixed at the common point O. Therefore, the area of the field lens 25 should be enough for covering the area from which the mixed light emits. Referring to FIG. 5, the field lens 25 can be in a hemispherical shape or in a spherical-segment shape. However, the shape of the field lens 25 is not limited to what is described above. All suitable shapes of the field lens 25 that allow a majority of the mixed light to be converged within can be employed. The field lens 25 has a bottom surface 251 and a curved surface 252 extended convexly along an edge of the bottom surface 251. The bottom surface 251 is a base of the field lens 25 and the curved surface 252 is an outside surface of the field lens 25. For example, the bottom surface 251 is a circular and planar surface, while the curved surface 252 is a hemispherical surface. A radius of the bottom surface 251, r, and a curvature radius of the curved surface 252, f, are satisfied by the following equation:

$$f/r \geq 1$$

In the present embodiment, the mixed light apparatus 20 of the present embodiment further includes an adhesive agent configured to connect with the field lens 25 and the light emitting surface 211. Particularly, a light curing agent or a heat curing agent can be disposed between the bottom surface 251 of the field lens 25 and the light emitting surface 211 so as to adhere the field lens 25 to the light emitting surface 211. Alternatively, the field lens 25 can be integrated with the first light reflecting element 22, the second light reflecting element 23 or the third reflecting element 24. In the present embodiment, the field lens 25 can be made of PMMA or glass.

However, the disposition of the field lens 25 above the light emitting surface 211 is not limited to what is mentioned above. If the bottom surface 251 of the field lens 25 is not a planar surface, e.g. being a curved surface, the field lens 25 can also be positioned by a fixing element, configured to fasten the field lens 25 to the common point O. Particularly, it appears that the field lens 25 is spaced apart from the light emitting surface due to the disposition of the fixing element (not shown).

In order to simply explain the mixed light apparatus 20 according to the present embodiment, one of the light reflecting elements 22, 23, 24, e.g. the first light reflecting element 22, is described in greater detail.

Referring to FIG. 1 and FIG. 4, the first light source 220, disposed at the first focal point 222 emits light into the solid light reflecting element 22 via the lateral surface 223b and/or the spherical bottom 223a of the concave structure 223. The incident light is reflected in the first light reflecting element 22 and is converged at the first emanating point 221 on the light emitting surface 211, which then diverges from the first emanating point 221.

In order to enhance the reflection efficiency, a reflection enhancement film is disposed on an outside surface of the light reflecting element 22. In addition, a light scattering film can be disposed on the light emitting surface 211 to effectively scatter light emitted therefrom. It is to be understood that light having a relatively large radiation angle can be shone through the lateral surface 223b of the concave structure 223 and be reflected by the oval-shaped surface of the light reflecting element 22 so as to eventually be converged to the emanating point O. However, light having a relatively small radiation angle can be shone through the spherical bottom of the concave structure 223 and is converged to the emanating point O.

The second light reflecting element 23 and the third light reflecting element 24 are the same as the first reflecting element 22. Because the emanating points 221, 231 and 241 overlap each other, the light separately emitted from the light source 220, 230, and 240 will be converged at one common point O, i.e. the emanating points 221, 231, 241, where the light is mixed to produce white light. Then, the white light is shone into and is converged by the field lens 25. Because the emitted light passing through the field lens 25 has a small angular aperture, the distribution of emitted light is concentrated. As a result, the emitted white light produced by the mixed light apparatus 20 of the present embodiment is concentrated and has high color saturation, improved uniformity, and high energy.

Furthermore, the light sources 220, 230, 240 can be connected to a controller so as to allow adjustment of the color of the light emitted from the light sources 220, 230, 240. Moreover, the mixed light apparatus 20 is not limited to producing only white light.

For examining an effect on mixing light and an illumination efficiency achieved by the mixed light apparatus 20 according to the present embodiment, the mixed light apparatus 20 employed in the digital light processing (DLP) was simulated using a computer program, Light Tools.

In the present embodiment, wavelengths of light emitted from the first light source 220, the second light source 230 and the third light source 240 are 550 nm, 430 nm and 670 nm, respectively. The inclined angles $\alpha_1, \alpha_2, \alpha_3$ of the axes L1 L2, L3 and the light emitting surface 211, respectively, are the same and equal to 60 degrees. Additionally, a hemispherical field lens 25 disposed above the light emitting surface 211 has a radius of the bottom surface 251, r, of about 4 mm and a curvature radius of the curved surface 252, f, of about 2 mm, as an example.

The software showed that a light spot obtained from the mixed light apparatus 20 of the present embodiment has a diameter of about 4 mm. In addition, illumination efficiency can be obtained to about 61% and 70% when light beams with radiation angles of ±45 degrees and ±90 degrees, respectively, are measured. As a result, the light spot size and the illumination efficiency are enhanced effectively.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A mixed light apparatus for mixing light emitted from a first light source and a second light source, comprising:
    a body having a light emitting surface;
    a first light reflecting element extending from the light emitting surface, the first light reflecting element having a first emanating point and a first focal point, the first light source being disposed at the first focal point;
    a second light reflecting element extending from the light emitting surface, the second light reflecting element having a second emanating point and a second focal point, the second light source being disposed at the second focal point, wherein the first emanating point and the second emanating point overlap at the light emitting surface; and
    a field lens disposed above the light emitting surface and corresponding to the first emanating point and the second emanating point.

2. The mixed light apparatus as claimed in claim 1, wherein the field lens is in a semi-spherical shape or in a spherical-segment shape.

3. The mixed light apparatus as claimed in claim 1, wherein the field lens has a bottom surface and a curved surface, the curved surface being extended convexly along an edge of the bottom surface.

4. The mixed light apparatus as claimed in claim 3, wherein a radius of the bottom surface r and a curvature radius of the curved surface f are satisfied by the following equation:

$$f/r \geq 1.$$

5. The mixed light apparatus as claimed in claim 1, further comprising an adhesive agent configured to connect with the field lens and the light emitting surface.

6. The mixed light apparatus as claimed in claim 5, wherein the adhesive agent is a light curing agent or a heat curing agent.

7. The mixed light apparatus as claimed in claim 1, wherein the field lens and the body are integrated.

8. The mixed light apparatus as claimed in claim 1, wherein the field lens is made of polymethyl methacrylate or glass.

9. The mixed light apparatus as claimed in claim 1, wherein the first emanating point and the first focal point are on a first axis, and the second emanating point and the second focal point are on a second axis.

10. The mixed light apparatus as claimed in claim 9, wherein a first inclined angle of the first axis and the light emitting surface or a second inclined angle of the second axis and the light emitting surface ranges from approximately 40 to 70 degrees.

11. The mixed light apparatus as claimed in claim 10, further comprising:
    a third light reflecting element extending from the light emitting surface, the third light reflecting element having a third emanating point and a third focal point, the third emanating point overlaps the first emanating point and the second emanating point, a third light source being disposed at the third focal point.

12. The mixed light apparatus as claimed in claim 11, wherein the third emanating point and the third focal point are on a third axis.

13. The mixed light apparatus as claimed in claim 12, wherein a third inclined angle of the third axis and the light emitting surface ranges from approximately 40 to 70 degrees.

14. The mixed light apparatus as claimed in claim 12, wherein angles between the first axis, the second axis, and the third axis are approximately equal.

15. The mixed light apparatus as claimed in claim 13, wherein the first inclined angle, the second inclined angle, and the third inclined angle are approximately 60 degrees.

16. The mixed light apparatus as claimed in claim 1, wherein the first light reflecting element or the second light reflecting element is a solid oval-shaped.

17. The mixed light apparatus as claimed in claim 1, wherein one of the first light reflecting element and the second light reflecting element comprises a concave structure disposed corresponding to one of the first focal point and the second focal point.

18. The mixed light apparatus as claimed in claim 17, wherein one of the first light source and the second light source is accommodated in one of the concave structures of the first light reflecting element and the second light reflecting element.

19. The mixed light apparatus as claimed in claim 17 wherein one of the concave structures is generally cylindrical or frustum-shaped.

20. The mixed light apparatus as claimed in claim 17, wherein one of the concave structures has a spherical bottom.

21. The mixed light apparatus as claimed in claim 1, wherein one of the first light reflecting element and the second light reflecting element is made of glass or polymethyl methacrylate.

22. The mixed light apparatus as claimed in claim 1, wherein the light emitting surface is a planar surface or a curved surface.

23. The mixed light apparatus as claimed in claim 1, wherein one of the first light source and the second light source is a light-emitting diode.

* * * * *